Oct. 19, 1965 A. MASON 3,212,987
NEUTRONIC REACTOR WITH INTERLOCKING DIFFUSER END GRID
Filed April 30, 1954 3 Sheets-Sheet 1
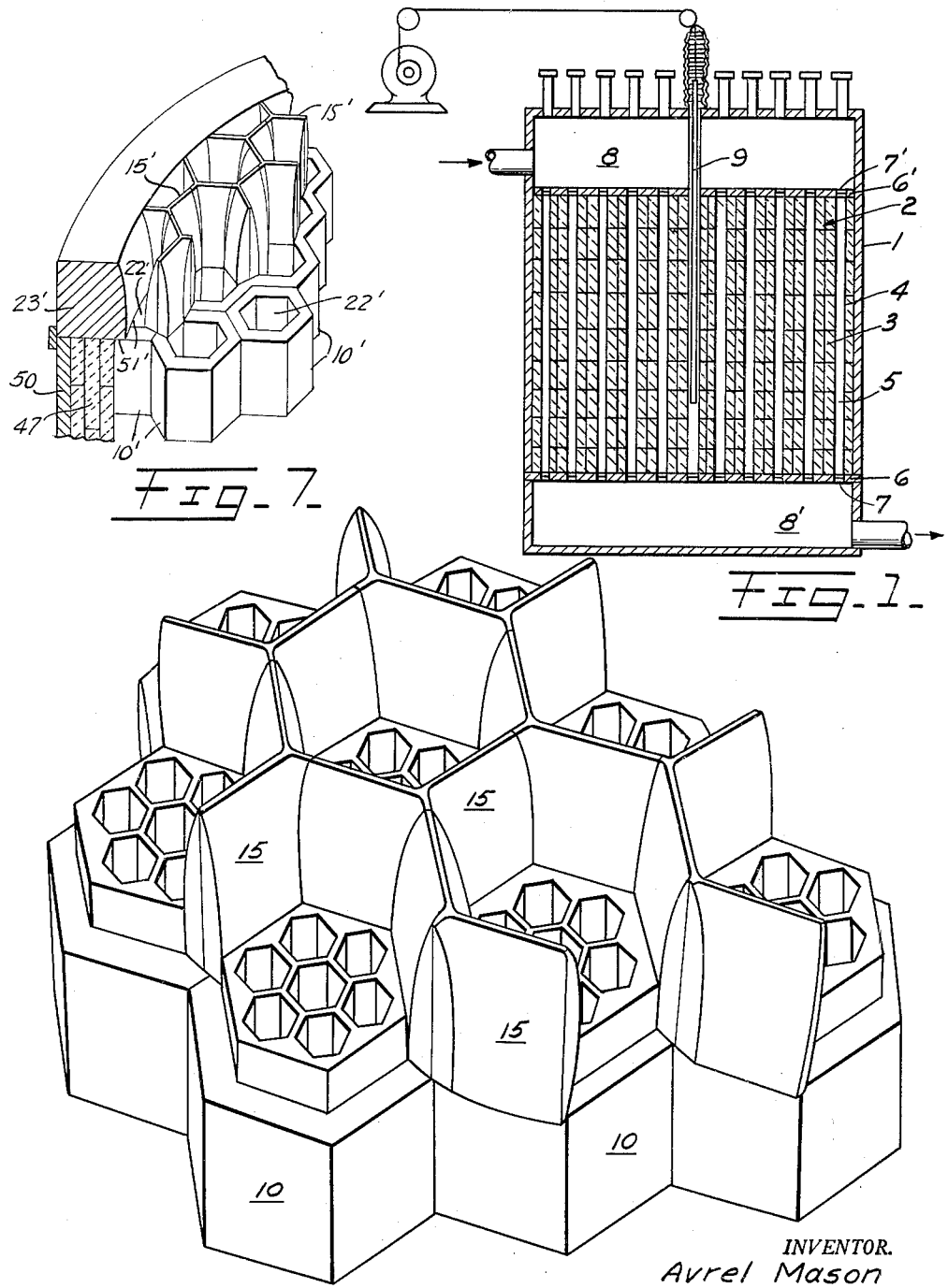
INVENTOR.
Avrel Mason
BY
*Roland A. Anderson*
ATTORNEY Oct. 19, 1965     A. MASON     3,212,987
NEUTRONIC REACTOR WITH INTERLOCKING DIFFUSER END GRID
Filed April 30, 1954     3 Sheets-Sheet 2
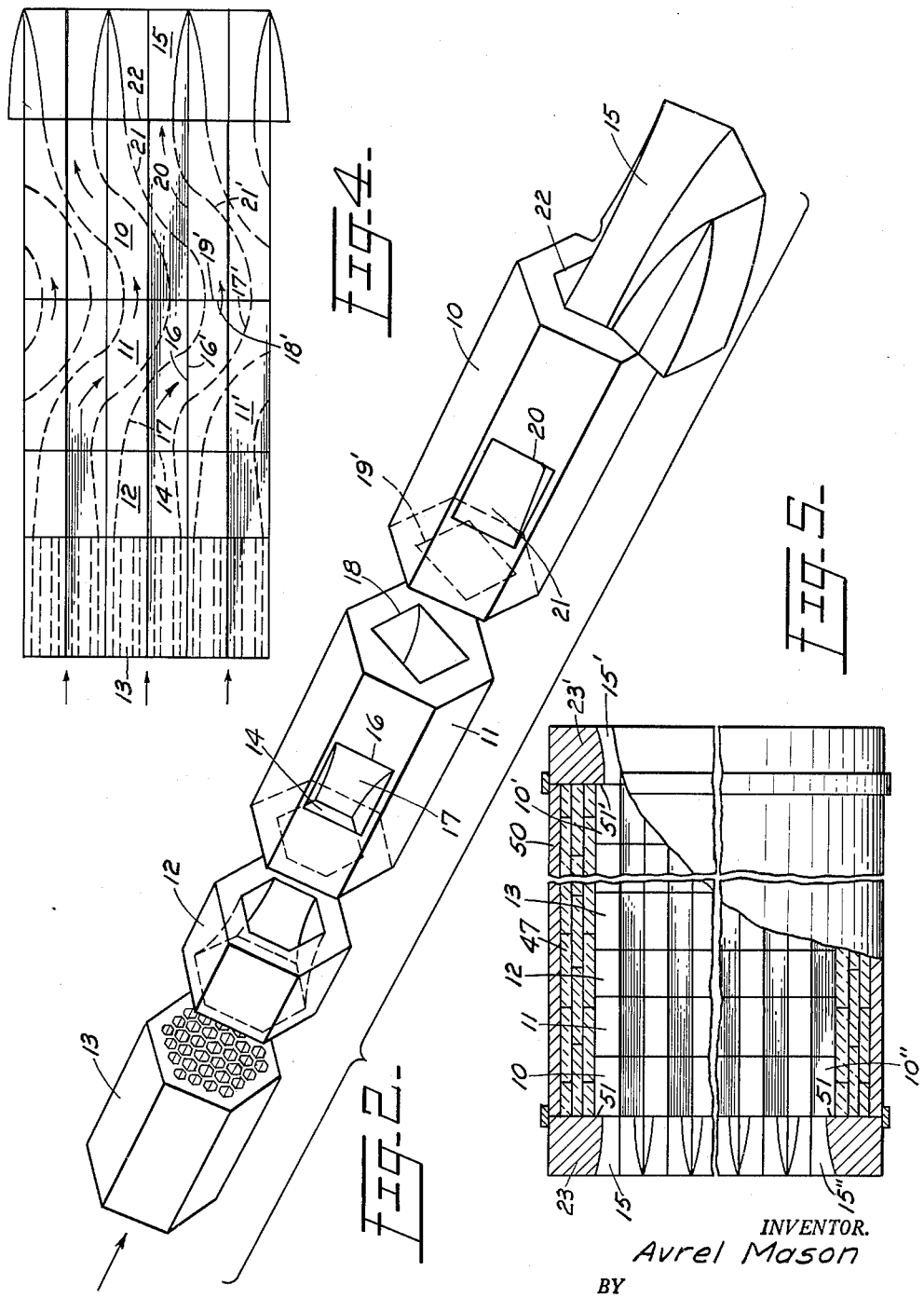
INVENTOR.
Avrel Mason
BY
Roland A. Anderson
ATTORNEY Oct. 19, 1965  A. MASON  3,212,987
NEUTRONIC REACTOR WITH INTERLOCKING DIFFUSER END GRID
Filed April 30, 1954  3 Sheets-Sheet 3

INVENTOR.
Avrel Mason
BY
Roland A. Anderson
ATTORNEY

United States Patent Office 3,212,987
Patented Oct. 19, 1965

3,212,987
NEUTRONIC REACTOR WITH INTERLOCKING DIFFUSER END GRID
Avrel Mason, Birmingham, Mich., assignor to the United States of America as represented by the United States Atomic Energy Commission
Filed Apr. 30, 1954, Ser. No. 426,945
6 Claims. (Cl. 176—61)

The present invention relates to neutronic chain reactors, and more especially to an improved construction whereby the reactor may successfully withstand severe stresses due both to thermal expansion and to the violent accelerating forces encountered in utilization of a reactor in the power plant of an airplane, ship, or other moving vehicle.

As is now known in the art, fissionable material such as uranium of atomic weight 235 and plutonium of atomic weight 239 when bombarded by neutrons will split into two or more nuclei and emit more neutrons. The emitted neutrons may be slowed down in a moderator material until they reach such an energy level that they will be absorbed in another nucleus and cause new fissions. The cycle of neutron moderation, nuclear adsorption, nuclear fission, and fast neutron emission constitutes a self-sustaining chain reaction when fissionable material of sufficient quantity is present.

A variety of physical shapes and sizes of neutronic reactors have been built or proposed for operation at a fixed location. Such reactors are not subject to stresses caused by sudden acceleration or deceleration, and generally contain no provision for protecting the reactor structure against such forces. Moreover, the reactors in the prior art are all surrounded by thick shields to protect personnel working in the vicinity from the deleterious effects of the radiation given off by such reactors. The active part of the reactor is spaced apart from the shield so that there is no problem created by differential thermal expansion of the reactor and shield. But in a movable reactor, the active portion and the shield must be packaged and maintained rigidly in place during violent accelerations. In addition, a shell or envelope must be provided to maintain the reactor under pressure. Such shell will become very hot due to the energy given off by the reactor, so that it will expand and contract with the reactor, but at a different rate, as the reactor temperature is raised and lowered.

To overcome certain problems associated with packaging a reactor for mobile use, it has been proposed that the active section or core of the reactor be made up of hexagonal bricks of a moderator such as berryllium oxide, beryllium carbide, or graphite, stacked one atop of the other to form a rectangular cylinder. Each brick is provided with one or more axial passages, and the passages are axially aligned so as to provide a plurality of continuous cylindrical apertures through the length of the cylinder. Through some or all of the apertures, fuel rods composed of a fissionable material, such as uranium dioxide, uniformly distributed in a moderator matrix, such as beryllium carbide, may be disposed. Such a reactor is disclosed in the co-pending application of Farrington Daniels, S.N. 713,660, filed December 3, 1946, now Patent No. 3,069,341. As an alternative to providing a series of fuel rods, the bricks forming the core may comprise a fissionable material uniformly disposed throughout the moderator material matrix. Surrounding the core section in either of the above reactors may be a neutron reflector cylinder comprising bricks identical in configuration with those making up the core, but having no fuel material incorporated in the moderator. The reflector may be enclosed in a metallic pressure shell which is provided with headers at either end for flow of a cooling medium, such as air, through the channels in the bricks. Fewer or smaller coolant passages per brick need be provided in the reflector than in the fuel elements, since the temperature is highest in the core.

In accordance with the present invention, additional hollow hexagonal bricks having the same outer configuration as the fuel and moderator but not necessarily the same length, and preferably containing internal curved baffles formed integrally therewithin, are arranged externally of the core and reflector blanket to provide a continuous but tortuous coolant path through the assembly, thus preventing leakage of neutrons from the active core portion to the header portions through the passageways in the bricks. The last brick at each edge of the cylindrical stack is provided with an overhanging diffuser lip extending both axially and radially outward from the outer face, so as to interlock with the outer faces of the next adjacent end bricks. By this interlocking arrangement, the core bricks are maintained rigidly in position even during violent accelerations, the axial thrust being transmitted from each end brick member radially outward through the adjoining overlapping diffusers to stress-receiving members near each end of the pressure shell. Moreover, the thermal expansion and contraction of the core and the end grid thus provided will be substantially identical, so that no misalignment of the coolant passages will result.

Accordingly, it is an object of the present invention to provide a novel neutronic reactor structure especially adapted to withstand severe radial and axial stresses.

A further object of my invention is to provide a novel reactor-containing structure for an active portion comprising a series of bricks provided with coolant passages whereby the coolant passages are maintained in exact radial and axial alignment by an end grid.

A further object of my invention is to provide an end grid for retaining the component pieces of a fluid-cooled nuclear reactor whereby free coolant flow is maintained, yet escape of neutrons is minimized.

Other objects and advantages of my invention will become apparent from a consideration of the following detailed description of a preferred embodiment thereof, when read in conjunction with the appended drawings, in which:

FIGURE 1 illustrates a reactor core, reflector, and shell, wherein the core is made up of a group of bricks provided with aligned axial passageways for receiving both fuel and coolant.

FIGURE 2 represents the elements comprising the novel end grid I have provided to maintain the active and moderator elements in position.

FIGURE 3 illustrates an end view of one configuration of interlocking diffuser elements forming the end pieces of my novel grid arrangement.

FIGURE 4 shows the serpentine coolant path formed in the end grid in position in a reactor according to my invention.

FIGURE 5 illustrates in partial section the pressure shell-end grid arrangement for holding the bricks in place in a reactor.

FIGURE 7 illustrates in greater detail the interlocking flange and diffuser lips.

Figure 6:
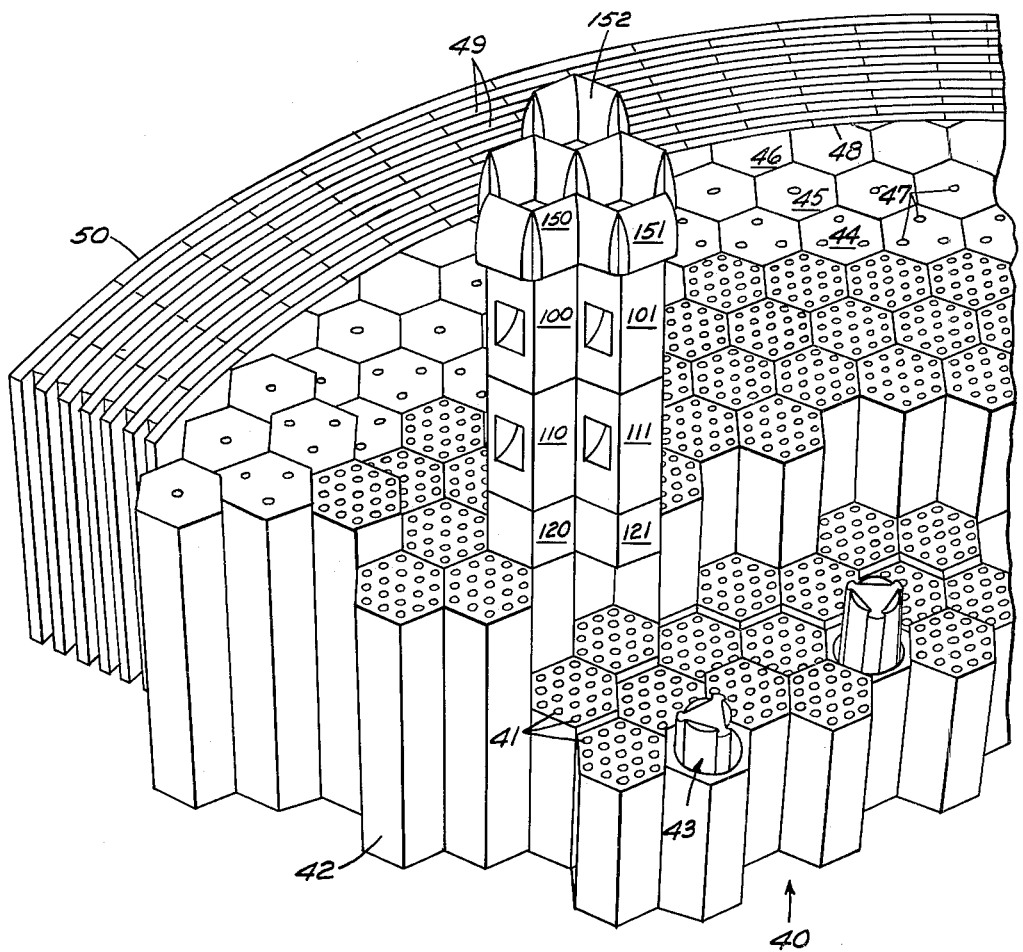
FIGURE 6 illustrates three end-grid elements in position at the end of a section of a reactor.

Referring now to FIGURE 1, envelope 1 forms a pressure-tight shell about the reactor proper. The active portion or core 2 may comprise a group of hexagonal bricks 3 each provided with an axial passage 4 therethrough and formed of a neutron moderator material, such as beryllium oxide. The bricks are placed end to end and aligned axially so as to form continuous passageways through the entire active portion, which preferably is in the form of a rectangular cylinder. Through certain of the passageways extend cylindrical fuel rods 5, which may be of a beryllium oxide matrix having uranium dioxide distributed uniformly therethrough. See the specification of the Daniels' application S.N. 713,660, supra now Patent No. 3,069,341, for a more complete description of such reactors. At opposite ends of the active core are provided metal plates 6, 6' having apertures 7, 7' registering with the coolant passages. Inlet header 8 and outlet header 8' form chambers at opposite ends of the shell 1 communicating with inlet and outlet passages for the coolant fluid.

The general outer configuration of the bricks shown stacked in position in FIGURE 1 is the same as those illustrated in FIGURE 2. The bricks are hexagonal, and may be three inches outer diameter, two inches inner diameter and three inches in length, while the fuel rods may be one and one-half inches in diameter, for example. The fuel rods should include uranium enriched in the isotope of atomic weight 235, so that from 20–60 percent of the uranium consists of the 235 isotope. The moderator bricks may comprise beryllium oxide of density 2.7 gm./cc. With 20 percent void space in the core, the height of the core cylinder would be 5.2 feet and the diameter would be 5.6 feet, thus requiring 7160 kilograms of beryllium oxide. If the uranium is enriched to contain 20 percent uranium-235, then 13.8 kilograms of $U^{235}O_2$ would be required for fuel, of which 12.2 kilograms is U-235.

In the reactor type wherein the fuel material is distributed uniformly within the moderator brick, a preferred brick configuration is three inches outer diameter and six inches in length. The bricks may be provided with a single axial passage as in FIGURE 1 or with a plurality of smaller, equally-spaced axially parallel passages, as is shown in FIGURE 2, brick 13, wherein nineteen apertures, each 0.4 inch in diameter, are provided. The moderator may comprise a mixture of beryllium carbide and graphite in the ratio of three molecules of beryllium carbide to each atom of graphite, the density of such mixture being 2.4 gm./cc. The fissionable material may be uranium 90% enriched in the U-235 isotope distributed uniformly throughout the moderator in the form $UC_2$, with a density of 10.1 gm./cc. The ratio of coolant channel volume to total core volume (free flow ratio) may be .3, with the channels being .125 inch in diameter and coated with .002 inch of molybdenum disilicate of density 6.27 gm./cc. to resist oxidation and corrosion.

For a molecular ratio of 1500 (molecules of $Be_2C$ per molecule of $U^{235}$) a reflector thickness of 3 inches, and free flow ratio of .3, a core four feet in diameter and four feet long would require substantially 21.7 lbs. U-235. The outer diameter of the reflector would be 4.5 feet, and the coolant flow area 3.8 sq. ft. The above criticality requirements are based upon an actual hot, poisoned, air-cooled reactor with coated channels, operating after 100 hours of operation at 600,000 kw. power, 2200° F., and at a pressure of 50 atmospheres inside the pressure shell.

Control of the chain reaction may be provided by means of one or more boron-alloy neutron absorber rods 9, or other conventional means well known in the art. Rod 9 may extend into one of the coolant passages and may be moved into and out of the core, where it serves to absorb neutrons in such numbers that the reaction will proceed slower or faster, depending upon the rod position, as is known in the art.

The exact composition and proportion of a nuclear reactor core forms no part of the present invention, which is a mechanical structural arrangement adapted for use with reactor cores of any density and/or size, the above descriptions being given purely as illustrations to show the setting for my invention, and not being intended in any limiting sense.

Referring now to FIGURES 2 and 4, my novel end grid arrangement comprises a plurality of hexagonal elements, of like configuration with the bricks forming the reactor stack and aligned with the end surfaces of those elements, for example, element 13. At the outer extremities an hexagonal element 10 is provided with an interlocking diffusing fin or lip 15. Penultimate element 11 is disposed in line with elements 10, 12 and the corresponding fuel brick 13. As is shown in the figures, continuous, tortuous passageways are provided when the bricks 10, 11, 12 are aligned. At the inner end of brick 12, a large aperture registers with the wall of brick 13, to receive coolant from all the passages therein. The walls of brick 12 taper inwardly in the direction of flow, and will focus coolant into the registering end aperture 14 of brick 11. A curved baffle member 17 therein serves to deflect the coolant through 90 degrees to aperture 16, and to a registering aperture 16' in the penultimate brick 11' disposed directly adjacent element 11, where it will strike a second curved baffle 17' and be deflected another 90° back along the original direction of coolant flow. The coolant will then pass through the end aperture 18' in an element 11', enter end aperture 19', be deflected 90° back down into element 10 by baffle 21', enter aperture 20, be deflected another 90° by baffle 21, and pass out through aperture 22 and the overhanging lip or diffuser 15 contiguous thereto. Thus the single baffles 17, 21 deflect coolant directed to both surfaces simultaneously, one path leading axially outward, the other leading radially outward.

As may be seen from the partial assembly of end elements shown in FIGURE 3, each diffuser element 15 overhangs the outer wall of the end brick 10 of which it forms an integral part. Each end brick is provided with only a section or portion of the complete hexagonal diffuser lip, and the segments on each brick are so arranged that when the bricks are stacked together, each diffuser overhangs the edge of one or more adjacent bricks and the lip segments fit together to form the complete hexagonal diffuser lip, so that the end grid serves to laterally restrain each individual brick by one or more diffuser elements. At the radially outward end of each grid, the overhanging portions of the outward diffuser elements contact a shoulder or flange 23, 23' on the shell 50 and are retained in position thereby. See FIGURE 5. Each of the lips or fins 15 fits together to form a hexagonal diffuser passageway at the end of the coolant passages so that air entering the header from the small passages through the bricks will recover its velocity head with miniumum losses.

Referring now to FIGURE 6, a partial, sectional view of a reactor with my novel elements incorporated therein is shown. The core structure 40 may be arranged in a cylindrical configuration 52.2 inches in both length and diameter. Coolant passageways 41, each 0.4 inch in diameter, extend from end to end parallel to the cylinder axis, and are formed by careful alignment of the apertures through the core and end grid bricks. There may be 270 hexagonal fuel elements 42, each provided with 19 longitudinal apertures, forming 5130 flow passageways. The bricks may be 7.5 inches in length and 3 inches across the hexagonal flats. Twelve absorption control rod assemblies 43 may be inserted symmetrically about the center of the core by removal of the corresponding fuel elements. The free-flow ratio of such a core will be 0.3.

The reflector may be divided into the jacket and the ends. The jacket comprises 3 layers of hexagonal moderator bricks 44–46 provided with aligned, axially parallel coolant passageways 47. The outer layer of moderator bricks 46 are altered as shown to conform to the cylindrical surface 48 of the graphite jacket 49 which is contained in pressure shell 50. The jacket elements may be curved graphite slabs 6 inches wide, 7.5 inches long, and 0.5 inch thick, and are arranged to form a continuous insulating jacket around the reflector. The reflector ends are approximate cylinders 52.2 inches in diameter and 19.5 inches in length. Each end comprises a plurality of end grid segments such as those shown in FIGURE 2 stacked to form a cylinder inside the overhanging flange members 23, 23'. The members 23, 23' are annular, so that the shoulders 51, 51' extend completely around the periphery of the reflector and contact the shoulders of each outer brick or part brick. Each outer brick or part brick 46 in turn bears one or more overhanging lip segments which contact the next inward ring of bricks 45, and the bricks 45 each bear overhanging lips which contact the next adjacent ring of bricks 44. Any force tending to move the bricks axially is thus transmitted radially outward from brick shoulder to mating brick lip to mating brick shoulder, and is finally absorbed in the annular shoulders 51, 51'. The overhanging diffuser lips of the outermost elements of the grid interlock for longitudinal retention of all the elements of the system, as is shown in FIGURE 3. The three bricks and diffusers forming the end elements are shown in place on the fuel elements, and are indicated by the numerals 100, 110, 120, 150 and 101, 111, 121, 151, 152. It will be understood that one end grid element is arranged to register with each brick having a coolant passage, three elements only being shown for clarity and simplicity.

The pressure shell 50 may comprise a hollow metallic cylinder provided with bolt flanges at each end, to which may be joined two hollow, semi-spherical headers containing entrance and exit duct flanges and control openings to form a structure as shown in FIGURE 1. Lugs may be built into the header flange to accommodate mounting links for attachment of the structure to an airframe, ship hull, or the like.

Referring now to FIGURE 5, the annular shoulders 51, 51', may be formed by the ends of shell 50, and contact the end faces of the outermost bricks in the moderator stack. Axial thrust will be absorbed by these shoulders, each brick transmitting the thrust radially outward through the end faces of bricks 10, 10', etc. and diffuser elements 15, 15', etc. to the shoulders. Two identical end grids are shown in place inside opposite flanges 23, 23' at opposite ends of the core. Only two elements 10', 15' of one end grid are shown, the remainder being omitted as shown by the broken lines.

Referring now to FIG. 7, the interlocking arrangement of flange 23' with the hexagonal members forming the end grid is shown in cross-section, in perspective. The end grid members 10' are stacked above the rows of bricks 46, 45, 44 and core brick 42 of FIG. 6. Shoulder 51' of flange 23' bears on the top of the radially-outermost members 10' stacked atop row 46. Those outermost members are provided with integral diffuser lips which overhang the top surfaces of the next outermost, adjacent members 10' stacked atop row 45, restraining them from axial movement. In like manner those next outermost members are provided with overhanging lips to restrain the next inward row of members 10', which are stacked over row 44. Accordingly all force tending to cause axial movement is transmitted outward to the flange 23' and there absorbed. Axial coolant flow is permitted, the coolant passing through diffusers 15' and apertures 22'. Each end grid comprises an assembly of the individual elements 10–13, 15 shown in FIG. 2.

Thus it may be seen that I have provided an especially advantageous reactor end grid which serves to block the direct radiation-escape path along coolant channels, but which does not unduly restrict coolant flow; which holds the reactor elements tightly in position despite great axial or radial accelerations; and which provides diffusers for coolant entering the end headers to improve coolant flow-conditions through the reactor.

Having described my invention, I claim:

1. In a neutronic reactor provided with a plurality of hexagonal, longitudinally apertured elements comprising a nuclear fuel disposed within a neutron moderator body arranged in a core structure to provide a plurality of parallel passageways therethrough for coolant flow, the improvement comprising: a pressure vessel provided with an inlet header, an outlet header, and a cylindrical body therebetween, means forming a rigid annular shoulder within said body at each end thereof, and an end grid comprising a plurality of hexagonal moderator elements of like external contour with said apertured elements arranged in axial alignment with the passages through corresponding core elements at both ends of said core, at least two of said elements containing baffles and apertures therein so arranged in relation to the corresponding baffles and apertures of the adjacent grid element as to provide a continuous, tortuous path for said coolant in flowing into and away from said core, each end element in said grid being provided with end bearing surfaces and a lip member extending longitudinally therefrom and overhanging said end surface to form a shoulder to engage the end bearing surface of an adjacent end element, the shoulder formed by each of the radially outermost elements being arranged to engage the inner surface of said rigid annular shoulder, whereby said hexagonal elements are held in axial and radial alignment.

2. In a neutronic reactor provided with a plurality of hexagonal, longitudinally apertured elements comprising a nuclear fuel uniformly disposed within a neutron moderator body arranged in a core structure to provide a plurality of parallel passageways therethrough for coolant flow, the improvement comprising: an outer metallic envelope provided with a pair of inwardly extending flanges at either extremity and an end grid comprising a plurality of hexagonal moderator elements of like external contour with said elements arranged in axial alignment with the passages through corresponding core elements at both ends of said core, at least two of said moderator elements containing baffles and apertures therein so arranged in relation to the corresponding baffles and apertures of the adjacent grid element as to provide a continuous, tortuous path for said coolant in flowing into and away from said core, each end element in said grid being provided with end bearing surfaces and a lip member extending longitudinally therefrom and overhanging said end surface to form a shoulder to engage the end bearing surface of an adjacent end element, the shoulder formed by each of the radially outermost elements being arranged to engage the inner surface of said flange, whereby said elements are held in axial and radial alignment.

3. In a neutronic reactor provided with a plurality of hexagonal, longitudinally apertured elements comprising a nuclear fuel disposed within a neutron moderator body arranged in a core structure to provide a plurality of parallel passageways therethrough for coolant flow, the improvement comprising: an outer metallic envelope provided with a pair of inwardly extending flanges at either extremity and an end grid comprising a plurality of hexagonal moderator elements of like external contour with said hexagonal elements arranged in axial alignment with the passages through corresponding core elements at both ends of said core, each end element in said grid being provided with end bearing surfaces and a lip member extending longitudinally therefrom and overhanging said end surface to form a shoulder to engage the end bearing surface of an adjacent end element, the shoulder formed by each of the radially outermost elements being arranged to engage the inner surface of said flange, whereby said hexagonal elements are held in axial and radial alignment.

4. In a neutronic reactor provided with a plurality of hexagonal, longitudinally apertured elements comprising a nuclear fuel disposed within a neutron moderator body arranged in a core structure to provide a plurality of parallel passageways therethrough for coolant flow, the improvement comprising: an outer metallic envelope provided with a pair of inwardly extending flanges at either extremity and an end grid comprising at least three hexagonal non-metallic neutron moderator elements of like external contour with said hexagonal elements arranged in axial alignment with the passages through corresponding core elements at both ends of said core, at least two of said moderator elements containing baffles and apertures therein so arranged in relation to the corresponding baffles and apertures of the adjacent grid element as to provide a continuous, tortuous path for said coolant in flowing into and away from said core, each end element in said grid being provided with end bearing surfaces and a lip member extending longitudinally therefrom and overhanging said end surface to form a shoulder to engage the end bearing surface of an adjacent end element, the shoulder formed by each of the radially outermost elements being arranged to engage the inner surface of said flange, whereby said hexagonal elements are held in axial and radial alignment.

5. In a neutronic reactor provided with a plurality of hexagonal, longitudinally apertured elements comprising a nuclear fuel disposed within a neutron moderator body arranged in a core structure to provide a plurality of parallel passageways therethrough for coolant flow, the improvement comprising: an outer metallic envelope provided with a pair of inwardly extending flanges at either extremity and an end grid comprising a plurality of hexagonal moderator elements of like external contour with said hexagonal elements arranged in axial alignment with the passages through corresponding core elements at both ends of said core, one of said moderator elements having an axial passage tapering in the direction of coolant flow to focus coolant from said hexagonal elements into a second of said moderator elements, said second and third moderator elements being each provided with end apertures, intermediate top and bottom apertures, and a diagonal partition forming curved ducts between each end aperture and one of said intermediate apertures, said grid elements being arranged with the top aperture of one element registering with the corresponding bottom element of the adjacent element to form a continuous tortuous coolant path, each end element in said grid being provided with end bearing surfaces and a lip member extending longitudinally therefrom and overhanging said end surface to form a shoulder to engage the end bearing surface of an adjacent end element, the shoulder formed by each of the radially outermost elements being arranged to engage the inner surface of said flange, whereby said hexagonal elements are held in axial and radial alignment.

6. In a nuclear reactor provides with a plurality of hexagonal elements comprising a nuclear fuel uniformly disposed within a neutron moderator body having passages therethrough for longitudinal coolant flow and arranged in a matrix, a converging tapered element fixed to one end of at least one side of a plurality of said elements and extending longitudinally therefrom in the direction of coolant flow, each of said elements overhanging the end of its respective block and the end of a block adjacent thereto to prevent relative movement of said adjacent block in the direction of coolant flow, said blocks being so arranged that two of said elements contact the external end of each side of the block members at the coolant exit end of said matrix except those sides forming the outward radial extremity for forming a diffuser stage of adjacent tapered elements, and retaining means arranged to contact the outer ends of each of said last named sides to prevent motion thereof in the direction of coolant flow.

References Cited by the Examiner

Nucleonics, November 1952, pages 56–60.

REUBEN EPSTEIN, *Primary Examiner.*

WILLIAM G. WILES, ROGER L. CAMPBELL,
*Examiners.*